United States Patent
Barowski et al.

(10) Patent No.: US 7,534,017 B2
(45) Date of Patent: May 19, 2009

(54) SYSTEM FOR PROVIDING ILLUMINATION

(75) Inventors: Dieter Barowski, Bochum (DE);
Reinhard Felgenhauer, Iserlohn (DE)

(73) Assignee: Delphi Technologies, Inc., Troy, MI (US)

( * ) Notice: Subject to any disclaimer, the term of this patent is extended or adjusted under 35 U.S.C. 154(b) by 9 days.

(21) Appl. No.: 11/511,960

(22) Filed: Aug. 29, 2006

(65) Prior Publication Data
US 2007/0047246 A1 Mar. 1, 2007

(30) Foreign Application Priority Data
Jun. 23, 2006 (EP) .................................. 06013026

(51) Int. Cl.
*B60Q 1/26* (2006.01)
(52) U.S. Cl. ...................... 362/488; 362/545
(58) Field of Classification Search ............... 362/231, 362/488, 490, 492, 493, 501, 511, 540, 541, 362/543–545, 800, 471, 494, 135, 136; 40/592, 40/593
See application file for complete search history.

(56) References Cited

U.S. PATENT DOCUMENTS

| | | | | |
|---|---|---|---|---|
| 5,944,414 | A * | 8/1999 | Nishitani et al. ............ | 362/490 |
| 6,203,180 | B1 * | 3/2001 | Fleischmann ............... | 362/471 |
| 6,402,354 | B1 * | 6/2002 | Tatewaki et al. ............ | 362/490 |
| 6,422,716 | B2 * | 7/2002 | Henrici et al. .............. | 362/249 |
| 2004/0246717 | A1 * | 12/2004 | Campbell .................... | 362/234 |
| 2005/0219854 | A1 * | 10/2005 | Grady ......................... | 362/490 |
| 2006/0050018 | A1 * | 3/2006 | Hutzel et al. ................. | 345/60 |
| 2006/0118676 | A1 * | 6/2006 | Novak et al. ............. | 244/129.1 |

FOREIGN PATENT DOCUMENTS

| | | |
|---|---|---|
| DE | 198 43 330 | 3/2000 |
| DE | 199 43 196 | 3/2000 |
| DE | 101 64 349 | 7/2003 |
| DE | 102 11 123 | 10/2003 |
| DE | 102 39 579 | 1/2004 |
| DE | 102 59 236 | 7/2004 |
| DE | 20 2004 010853 | 9/2004 |
| DE | 103 32 158 | 2/2005 |
| WO | WO 2004/114736 | 12/2004 |

OTHER PUBLICATIONS

European Search Report dated Oct. 4, 2006.

* cited by examiner

*Primary Examiner*—Bao Q Truong
(74) *Attorney, Agent, or Firm*—Thomas N Twome

(57) ABSTRACT

An illumination system for a vehicle is provided and includes a plurality of illumination units each having at least one light emitting diode attached thereto. A plurality of electrical leads connect the plurality of illumination units. The plurality of illumination units and the plurality of electrical leads are interconnected to define an illumination circuit that is embedded within at least one vehicle structure. Light emitted by at least one of the illumination units is guided from within the at least one vehicle structure to illuminate a vehicle interior.

23 Claims, 8 Drawing Sheets

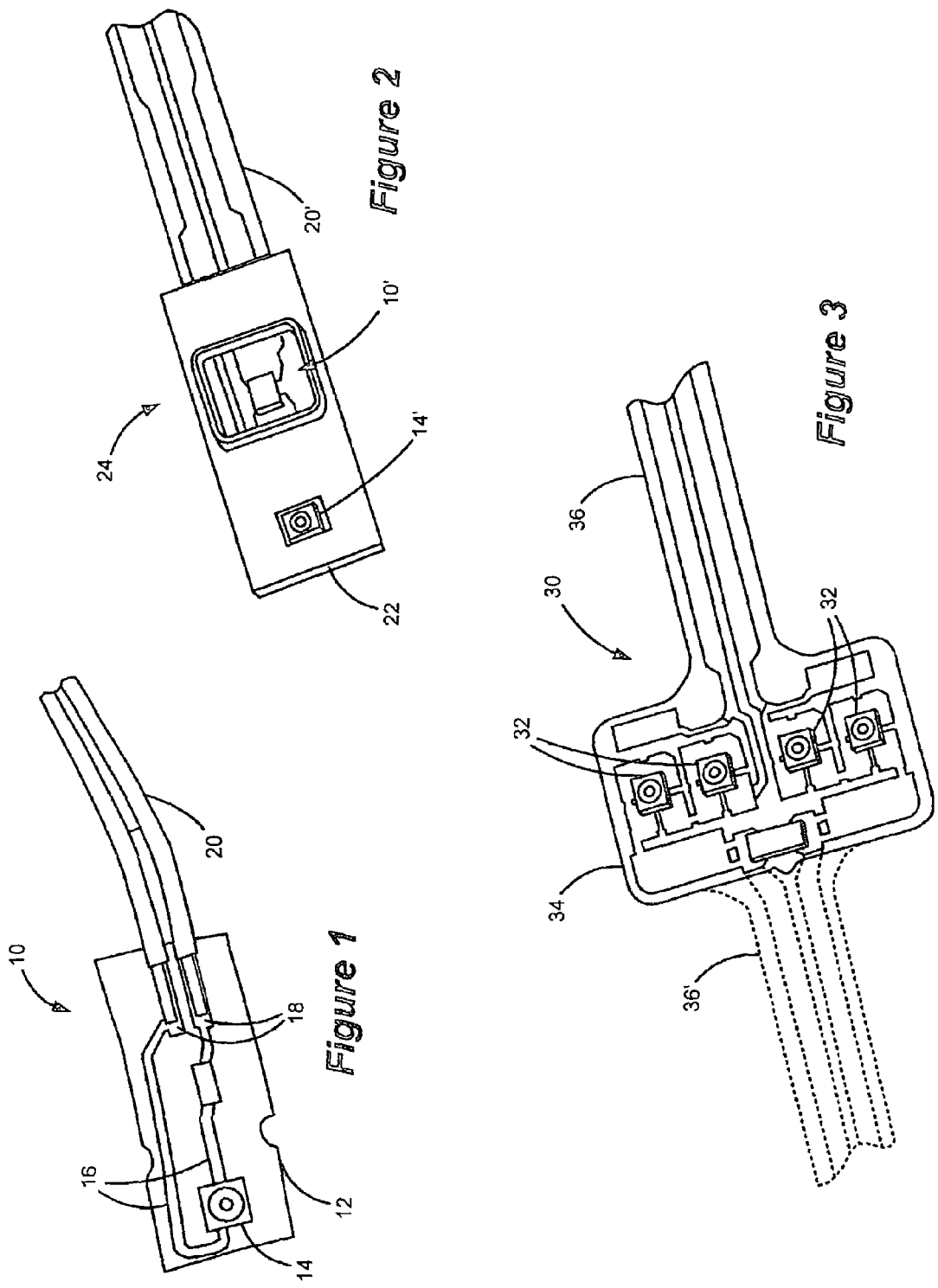

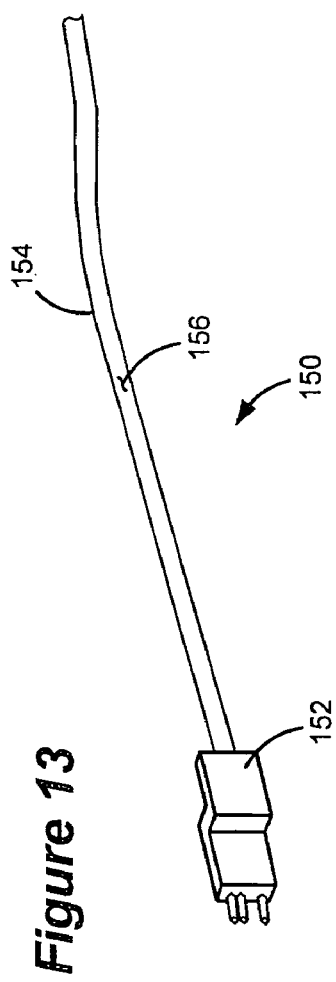
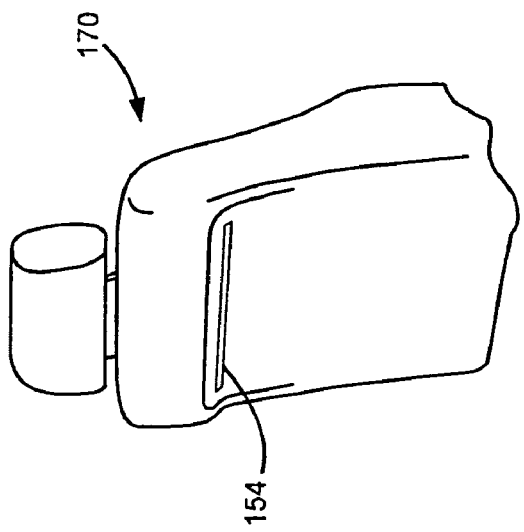
Figure 13
Figure 14
Figure 15

SYSTEM FOR PROVIDING ILLUMINATION

The present invention is directed toward a system for providing illumination, and more particularly to a system for providing illumination within a vehicle interior using light emitting diodes (LEDs).

In today's competitive environment, vehicle manufacturers seek ways to differentiate their products from the competition. In particular, manufacturers strive to improve the function and the aesthetics of their products. Manufacturers concurrently strive to decrease costs by reducing component count (i.e., simplifying their products), and by simplifying the assembly process.

It has been recognized that vehicle manufacturers have an on-going need to provide distinctive, leading-edge designs. One important area for such designs includes the vehicle interior, and more specifically, vehicle interior illumination. Interior illumination impacts both function and aesthetics. Functionally, interior illumination traditionally includes dome and reading lamps, visor lamps and courtesy lighting. Aesthetically, interior illumination traditionally includes back-lighting of various components.

Interior illumination is typically achieved using incandescent bulbs, which retain specific disadvantages. One such disadvantage is inefficiency, which results in significant heat generation. For example, incandescent light bulbs waste approximately 95% of the power they consume in the form of heat, resulting in an efficiency of approximately only 5%. Another disadvantage is their relatively short life-span. Because of their short-life span and the amount of heat generated, the incandescent bulbs must be located at the surface of an interior cover panel, where they are able to cool and are readily accessible for replacement. Further, a bulb socket is required when using an incandescent bulb in order to connect the incandescent bulb's standard fitting to a power source. The bulb fitting is large and is an additional component. As a result, the required bulb fitting increases component count, limits the space within which the incandescent bulb can be used, as well as increases assembly complexity and the associated costs.

An alternative to an incandescent bulb is a light emitting diode (LED). Although LEDs have been widely used as an alternative to incandescent bulbs in non-automotive environments, their use has been traditionally limited to glove box lamps, center or high mounted stop lamps, and more recently to exterior brake lighting and side panel markers in automotive applications.

WO 2004/114736 A2 discloses an LED illumination device having a plurality of LED lamp modules that are strung together. The LED illumination device can be implemented as an interior roof lamp, a reading lamp, or to light the interior of small containers, such as an ashtray, a glove box or a cup holder. Because of the size and bulkiness of the LED illumination device and the LED lamp modules, they are not able to be implemented in relatively thin vehicle structure (e.g., a vehicle roof assembly). For example, in the case of a dome or reading lamp, the LED illumination device must be provided as part of dome or reading lamp assembly that hangs into the vehicle interior from the roof. Such assemblies detract from the vehicle interior aesthetics and require additional parts and assembly. Further, the LED illumination device of WO 2004/114736 A2 must be at or near an interior surface in order for the emitted light to illuminate its target area.

Accordingly, it is the object of the present invention to provide a system of providing illumination in a vehicle, which improves the function and aesthetics of a vehicle interior, which reduces costs, which expands vehicle illumination options, and which enables the above-mentioned distinctive, leading-edge interior designs to be achieved.

This object is achieved through the characterizing features of the independent claims.

In accordance with one advantageous embodiment of the present invention, at least one vehicle structure includes a gap that is defined between an exterior shell and a cover. An illumination unit is disposed within the gap at a location that is remote from a light distribution surface that is exposed to the vehicle interior. By enabling the illumination unit to be remotely located, an interior illumination source can be provided at any location within the vehicle interior, regardless of whether there is packaging space for the illumination unit immediately adjacent to the interior illumination source.

In accordance with another advantageous embodiment of the present invention, each illumination unit is integrated with at least one of a conventional round wire electrical lead and/or a flexible flat wire electrical lead. By integrally connecting the electrical leads to the illumination units, an additional connector is foregone, thereby reducing the cost and complexity of the illumination system.

In accordance with still another advantageous embodiment of the present invention, the illumination unit includes a flexible printed circuit board. The flexible printed circuit board allows the illumination unit to be bent or otherwise shaped to a desired form, thereby increasing the in-vehicle packaging options for locating the illumination unit to illuminate the vehicle interior.

In accordance with another advantageous embodiment of the present invention, a light guide is provided and includes a light receiving face, a body and at least one light emitting face. The light guide receives light emitted from the LED and guides the light through a path defined by the body of the light guide from within the vehicle structure. A secondary light guide can also be provided and includes a surface that reflects or absorbs light. In this manner, the light that is directed through the body of the light guide can be enhanced or diminished to provide a desired illumination effect.

In accordance with still another advantageous embodiment of the present invention, the illumination unit includes a plurality of LEDs that are of the same color or of different colors. In the case where the plurality of LEDs is the same color, several levels of dimness are provided by illuminating a select number of the LEDs. In the case where the plurality of LEDs is of different colors, the illumination unit can illuminate the vehicle interior in each of the different colors or a combination of the different colors to provide an occupant selectable, mood lighting effect.

In accordance with yet another advantageous embodiment of the present invention, a central, high-mounted stop lamp is provided and includes a thickness of less than 7 mm. As a result, the stop lamp requires reduced in-vehicle packaging space, is lighter, is easier to manufacture, and can be directly mounted to a rear glass panel, thereby eliminating the need for additional mounting brackets and the like, to simplify and reduce the cost of vehicle manufacture.

The present invention will be more fully understood from the following description in hand with the following figures, in which:

FIG. 1 is a perspective view of an exemplary integrated light emitting diode (LED) illumination unit in accordance with the present invention;

FIG. 2 is a perspective view of a light source module (LSM) in accordance with the present invention, and which includes an exemplary housing and the integrated LED illumination unit of FIG. 1;

FIG. 3 is a perspective view of an alternative integrated LED illumination unit in accordance with the present invention;

FIG. 13 is a perspective view of an LSM including a linear light guide;

FIG. 14 is a partial perspective view of a vehicle center console that is illuminated by the illumination system in accordance with the present invention;

FIG. 15 is a partial perspective view of a vehicle seat that that is illuminated by the illumination system in accordance with the present invention.

Figure 5:
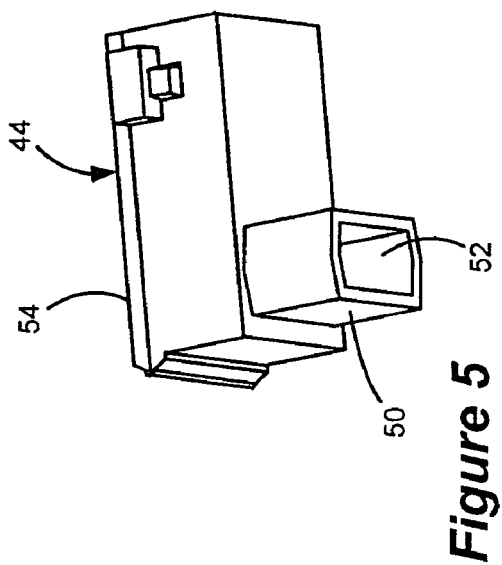
FIG. 5 is a perspective view of the LSM of FIG. 4.

Referring now to FIGS. 1 and 2, a light emitting diode (LED) illumination unit 10 is illustrated and includes a printed circuit board (PCB) 12 and an LED 14. The PCB 12 includes a relatively thin base layer having a plurality of flat electrical conduits 16 formed thereon. The PCB 12 is preferably a flexible PCB that can be bent or formed as desired. More specifically, the PCB is formed by etching a flexible polymer substrate and then printing conductive patterns (i.e., the electrical conduits) thereon. The polymer substrate is subsequently covered by a plastic laminate or conformal coating.

The electrical conduits 16 of the PCB 12 include connection pads 18 that enable the LED illumination unit 10 to be directly connected (e.g., through soldering) to an electrical lead 20. The electrical lead 20 of FIG. 1 is illustrated as a conventional, round-wire electrical lead. By directly connecting the electrical lead 20, the electrical lead is effectively integrally formed with the PCB 12, and reduces the need for additional electrical connectors. The electrical lead of FIG. 2 is illustrated as a flexible flat cable (FFC) 20' having a thinner cross-sectional profile than the electrical lead 20 of FIG. 1. The FFC 20' includes flat conductors that are rolled or cut and that are laminated within a flexible plastic film. The use of the FFC 20' enables the electrical lead to be integrally formed with the PCB 12, thereby reducing the number of electrical connectors required, which, in turn, reduces the assembly complexity and cost while increasing the packaging options.

The LED illumination unit 10' of FIG. 2 is enclosed within a housing 22 to define a light source module (LSM) 24. The housing 22 is preferably formed of plastic and includes openings, through which components of the LED illumination unit 10' are accessible, and through which light generated by the LED 14' can be emitted.

Referring now to FIG. 3, an alternative LED illumination unit 30 is illustrated. The LED illumination unit 30 includes a plurality of LEDs 32 and a PCB 34 having a correspondingly more complex electrical conduit architecture formed thereon. It is anticipated that the LEDs 32 can each emit the same color of light, or each can emit a distinct color. In the case where the LEDs 32 emit the same color, dimness levels can be provided. For example, if all of the LEDs 32 are active, the brightest illumination is provided. If only a single LED 32 is active, the lowest illumination is provided. In the case where the LEDs 32 emit different colors, the illumination can be provided in each of the different colors, as well as in any combination of the colors.

The LED illumination unit 30 further includes an integrally formed FFC electrical lead 36. As a result, the electrical lead 36 is directly connected to and is an extension of the PCB 34. In this manner, a connection interface (e.g., soldered interface) is foregone, and the PCB 34 and electrical lead 36 can be formed as a single component, reducing component count and associated assembly costs. It is also anticipated that the LED illumination unit 30 can include another electrical lead 36', shown in phantom. The electrical lead 36' is preferably connected to a second LED illumination unit (not shown) to define a chain of integrated LED illumination units.

Figure 4:
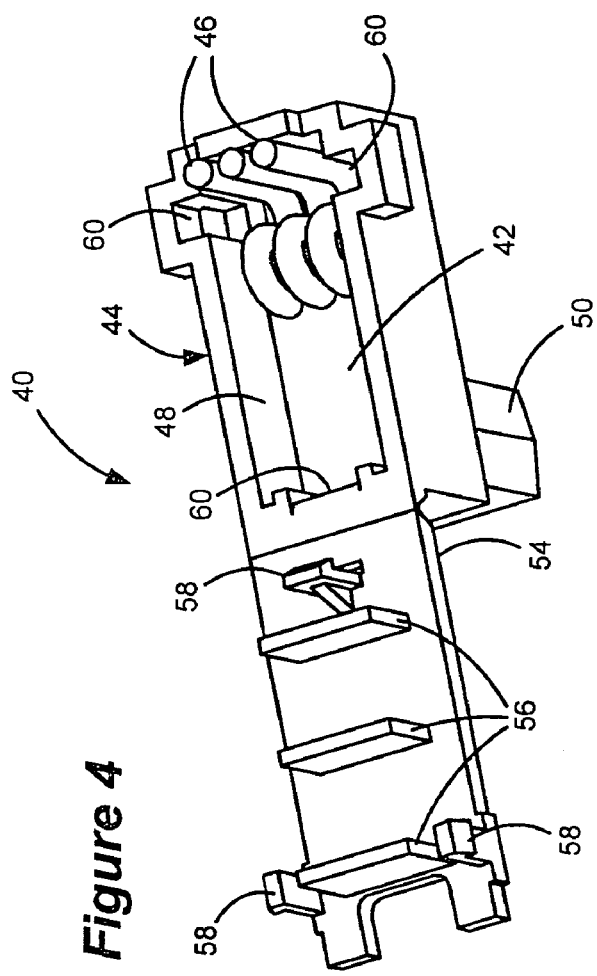
FIG. 4 is a perspective view of an alternative LSM.

With reference to FIGS. 4 and 5, an alternative LSM 40 is illustrated and includes an LED illumination unit 42 and housing 44. Although the illustrated LED illumination unit 42 includes conventional round-wire electrical leads 46, it is anticipated that an LED illumination unit having a flat-wire electrical lead can also be implemented. The housing 44 includes a recess 48, an extension 50 defining a passage 52, and a cover 54. The LED illumination unit 42 is received within the recess whereby the LED is aligned with the passage 52 to emit light generated by the LED from the housing 44. The cover 54 includes a back surface having retention blocks 56 and tabs 58 formed thereon. Upon closing the cover 54, the retention blocks 56 push the LED illumination unit 42 into position within the recess 48, and the tabs 58 engage respective openings 60 to secure the cover 54 in the closed position.

Figure 6:
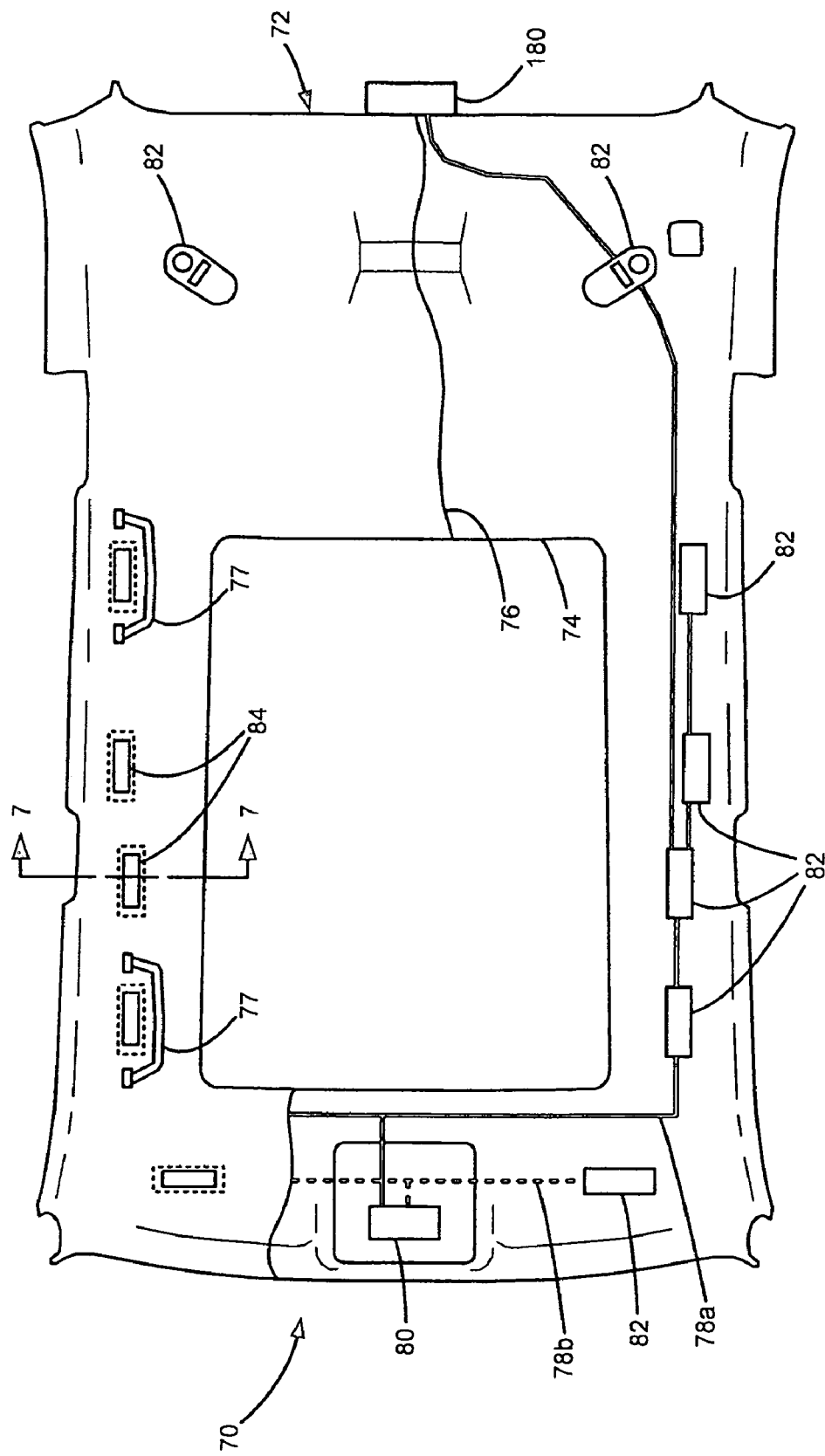
FIG. 6 is a plan view of an exemplary vehicle roof assembly that incorporates an illumination system in accordance with the present invention.
Figure 7:
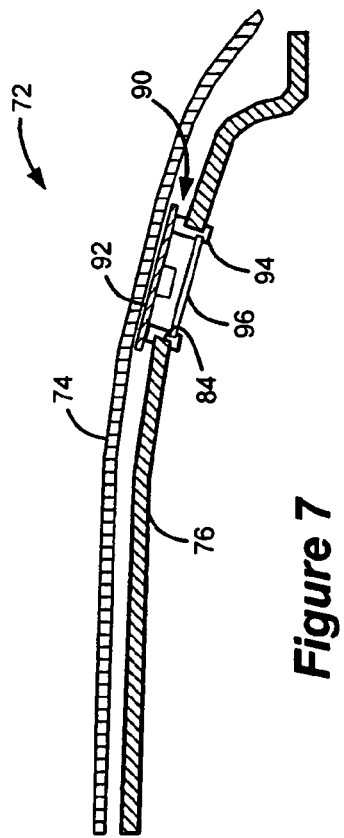
FIG. 7 is a cross-sectional view of the vehicle roof assembly along the line 7-7 in FIG. 6.

Referring now to FIGS. 6 and 7, an illumination system 70 is provided for illuminating a vehicle interior. In the exemplary embodiment of FIG. 6, the illumination system 70 is embedded within a vehicle roof assembly 72. It is anticipated, however, that the illumination system can be embedded within and extend between a plurality of different vehicle assemblies including, but not limited to, a floor assembly, a door assembly and/or a seat assembly. The vehicle roof assembly 72 includes an exterior roof panel 74 and an interior cover panel 76, which is partially illustrated. Handles 77 are also mounted to the vehicle roof assembly 72. The illumination system 70 runs between the exterior roof panel 74 and the interior cover panel 76, and includes first and second illumination circuits 78a, 78b, and a junction unit 80. The junction unit 80 connects the illumination circuits 78a, 78b to a power source (not shown) and a control unit (not shown), which regulates the operation of the illumination circuits 78a, 78b.

The illumination circuits 78a, 78b each include a plurality of LED illumination units and/or LSMs 82. More specifically, some of the LED illumination units and/or LSMs 82 are aligned with openings 84 in the interior cover panel 76 to provide interior roof lighting that functionally enables vehicle occupants to see within the vehicle interior, and that provide improved vehicle interior aesthetic qualities. For example, the illumination system 70 can emit sufficient light through the openings to dimly light the vehicle interior, or to more brightly light the vehicle interior when a door, for example, is opened. In this manner, a traditional dome-light can be replaced. In an alternative example, the LEDs of the illumination system 70 include multiple colors. Accordingly, the vehicle interior can be back-lit in any one of the multiple colors, or in any combination of the multiple colors. In this manner, the vehicle occupants can set the interior lighting to provide so-called mood lighting. The LED illumination units and/or LSMs 82 are also implemented in reading or courtesy light assemblies, for example, that are electrically coupled to the illumination circuits 78a, 78b, and/or to highlight the handles 77.

With particular reference to FIG. 7, a section of the vehicle roof assembly 72 is illustrated including an exemplary LED illumination assembly 90 embedded therein. The exemplary LED illumination assembly 90 includes an LED illumination unit 92, a frame 94 and a cover 96. The frame 94 secures the LED illumination assembly 90 to the opening 84 of the interior cover panel 76, and the cover 96 enables light to be transmitted therethrough to illuminate the vehicle interior.

Figure 9:
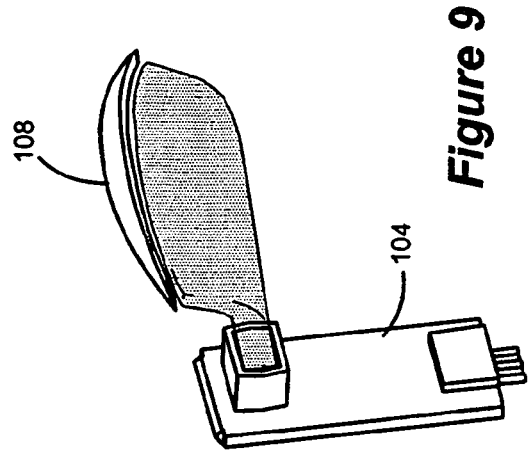
FIG. 9 is a perspective view of an LSM that is incorporated in the assembly of FIG. 8.
Figure 8:
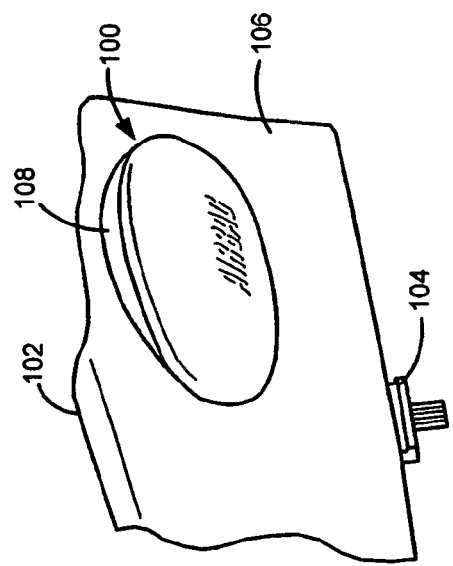
FIG. 8 is a partial perspective view of an exemplary assembly that is integrated into a vehicle cross-beam and that is illuminated by the illumination system in accordance with the present invention.

Referring now to FIGS. 8-12, it is also anticipated that illumination system can wholly or partially light vehicle interior assemblies. With particular reference to FIGS. 8 and 9, an exemplary vehicle interior assembly includes an airbag indicator 100, which identifies the location of an airbag system within a vehicle cross-beam 102 (e.g., a cross-beam between the A and B pillars, and/or the B and C pillars of the vehicle body). An LSM 104 is embedded within a cross-beam cover 106 and is remotely located from the airbag indicator. The LSM 104 emits light, which is guided through the cover 106 to a translucent light distribution surface 108. The light travels through the translucent light distributor 108 to aesthetically highlight the airbag indicator 100. It is anticipated that the translucent light distribution surface 108 can be colored to emit a correspondingly colored light. Because the LSM 104 is embedded within the vehicle structure and is remote from the interior assembly (e.g., the airbag indicator), the LSM 104 can be positioned in an area of the vehicle structure that has sufficient space for receiving the LSM 104 and/or that is readily accessible for installing or accessing the LSM 104.

It an alternative embodiment, the translucent light distribution surface 108 is not associated with an interior assembly. Instead, the translucent light distribution surface 108 can be positioned on a vehicle structure to direct light in a desired direction. For example, the translucent light distributor 108 can be integrated into the cover of a A-, B- and/or C-pillar to direct light emitted by the LSM 104 to highlight a vehicle roof.

Figure 11:
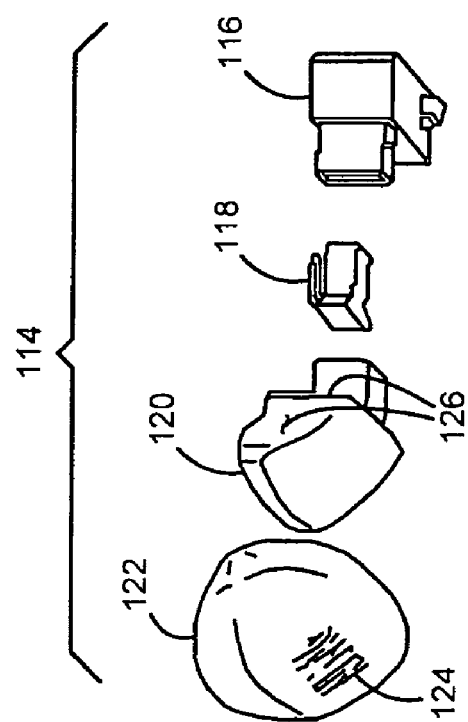
FIG. 11 is an exploded perspective view of components of the assembly of FIG. 10.
Figure 10:
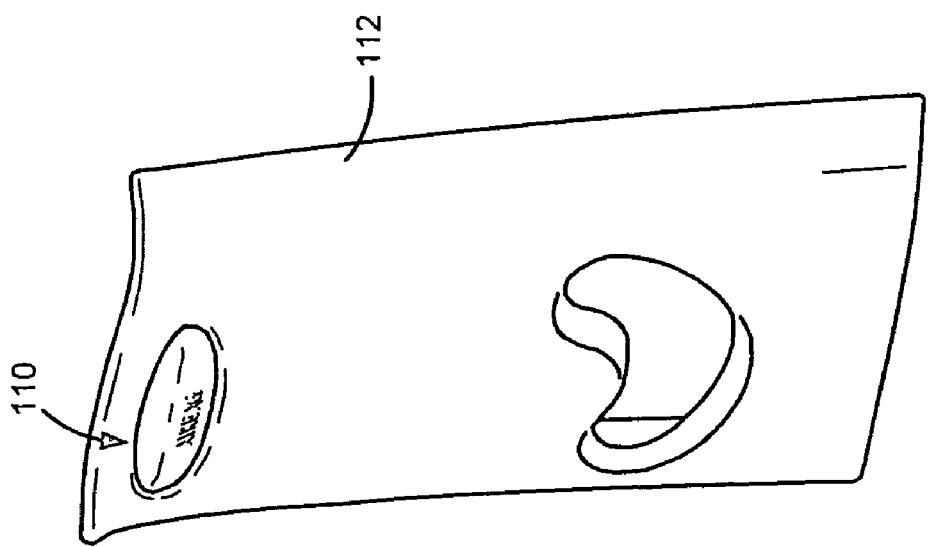
FIG. 10 is a partial perspective view of an alternative assembly that is integrated into a vehicle pillar and that is illuminated by the illumination system in accordance with the present invention.

With particular reference to FIGS. 10 and 11, an alternative airbag indicator 110 is integrated with a B-pillar cover 112. More specifically, a light source assembly (LSA) 114 includes an LSM 116, a primary light guide 118, a secondary light guide or so-called white box 120, and a cover 122. The primary light guide 118 is attachable to the extension of the LSM 116 and is partially received within the passage. The secondary light guide 120 is adapted for connection with the primary light guide 118 to further transmit the emitted light. The cover 122 includes openings 124 that define an indicator, in this case the word "AIRBAG". Light that is emitted from the LSM 116 and that is transmitted through the primary and secondary light guides 118, 120 is further emitted through the openings 124, lighting the indicator 110. The light distribution surface can diffuse and direct light from the LED towards a vehicle roof.

The secondary light guide 120 can alter the emitted light, by providing a desired color, by intensifying the light, by dulling the light, and/or by focusing the light. For example, the secondary light guide 120 can include back surfaces 126 that are bright to reflect the emitted light in a desired direction to more brightly light the indicator 110. Alternatively, the secondary light guide 120 can include darker back surfaces 126 that absorb a portion of the light to more dimly light the indicator 110.

Figure 12:
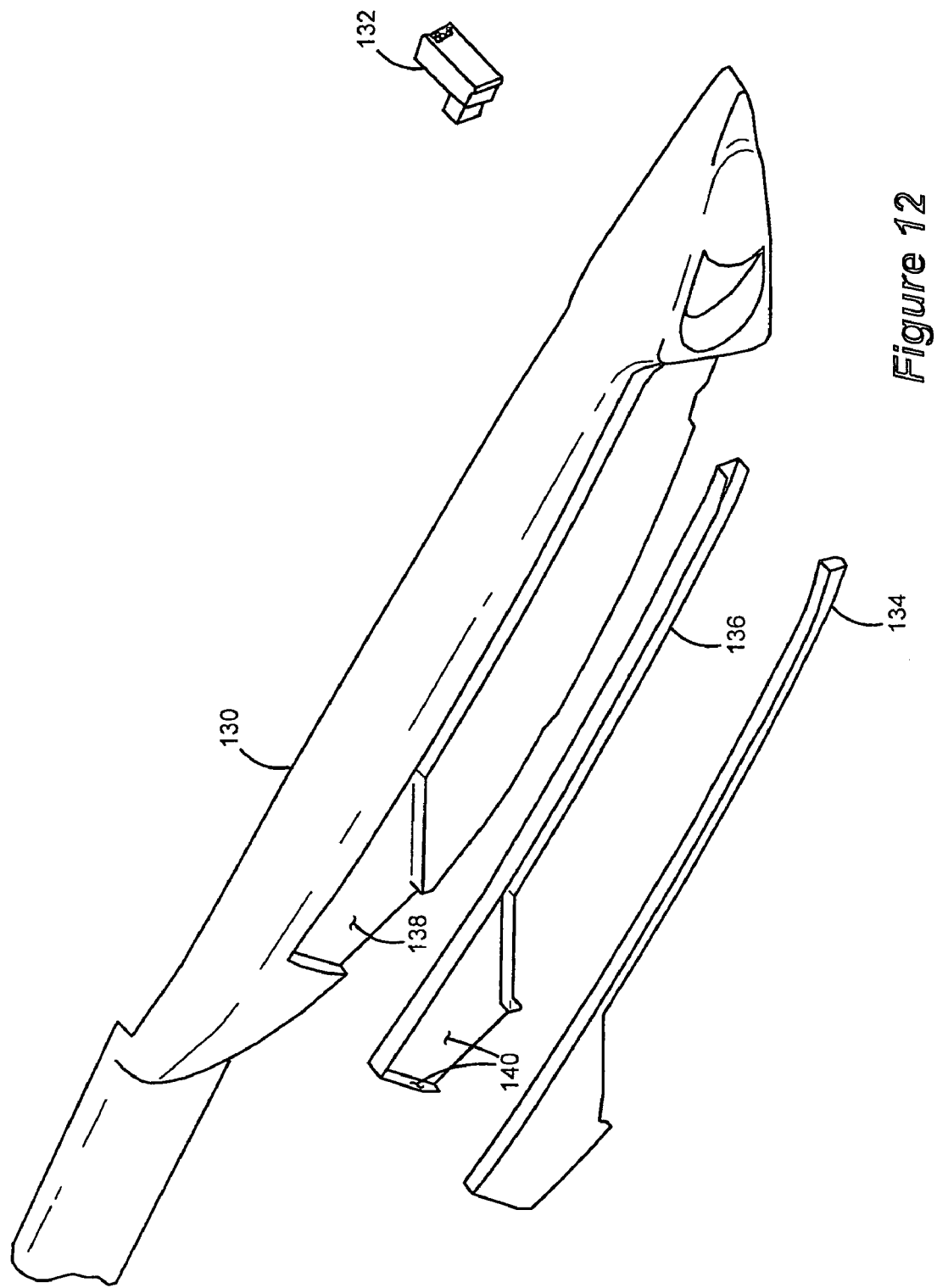
FIG. 12 is an exploded perspective view of components of a vehicle arm rest assembly that is adapted to be incorporated in a vehicle door panel and that is illuminated by the illumination system in accordance with the present invention.

With particular reference to FIG. 12, an alternative LSA is illustrated and is implemented within an arm rest 130 of a vehicle door. The LSA includes an LSM 132, a primary light guide 134 and a secondary light guide 136. The LSM 132 is embedded within the arm rest 130, the primary light guide 134 is received within the secondary light guide 136, which in this case is formed as a shell, and the assembled primary and secondary light guides 134, 136 seat within a correspondingly shaped groove 138 of the arm rest 130. Light that is emitted by the LSM 132 is guided through the primary light guide 134 and illuminates the vehicle interior. The secondary light guide 136, in this case, includes light reflecting and/or light absorbing surfaces 140 to manipulate the light. For example, reflecting surfaces 140 enable a more intense illumination, while absorbing surfaces 140 enable a less intense illumination. It is also anticipated that the secondary light guide 136 can include both reflecting and absorbing surfaces 140.

The illumination provided by the LSAs described herein can be for aesthetic purposes and/or functional purposes. For example, upon opening a vehicle door, the light emitted by the LSAs can be made more intense to more brightly illuminate the vehicle interior or even an area exterior to the vehicle, in the case where the vehicle door, having the LSA described immediately above, is opened.

FIG. 13 illustrates still another alternative LSA 150 including an LSM 152 and a primary light guide 154. The primary light guide 154 is provided as a flexible, translucent tube or solid conduit that is coupled to the LSM 152. Light emitted by the LSM 152 travels along the primary light guide 154 and is transmitted through a circumferential surface 156 of the primary light guide 154. It is anticipated that a portion of the circumferential surface 156 can include an opaque coating to inhibit light transmission therethough.

The LSA 150 can be implemented in a number of vehicle components to provide both functional and aesthetic illumination. As seen in FIG. 14, the LSA 150 can be implemented in a center console 160, whereby the primary light guide 154 outlines an interior geometry of the center console to provide an aesthetically pleasing effect and to illuminate the interior 162 of the center console. FIG. 15 illustrates a seatback 170 having the LSA 150 embedded therein, whereby the primary light guide 154 runs across a width of the seatback 170 to provide courtesy or reading illumination for a back seat passenger. By providing illumination that is directed to a particular occupant (e.g., to the lap of the back seat occupant) other occupants, particularly those in the front, are not affected by the illumination. In this manner, the driver, for example, is not distracted by interior reflections that result when using traditional reading lamps.

Although specific exemplary applications have been described herein, it is anticipated that the illumination system including the LED illuminating units, LSMs and LSAs, described herein, can be implemented in any number of alternative applications. Exemplary alternative applications include, but are not limited to, illuminating a doorsill, a reading lamp, an interior courtesy light, illuminating a pillar (e.g., A-, B-, and/or C-pillar), illuminating a door handle, illuminating a door lock, and illuminating a vanity mirror (e.g., within a visor).

Figure 16:
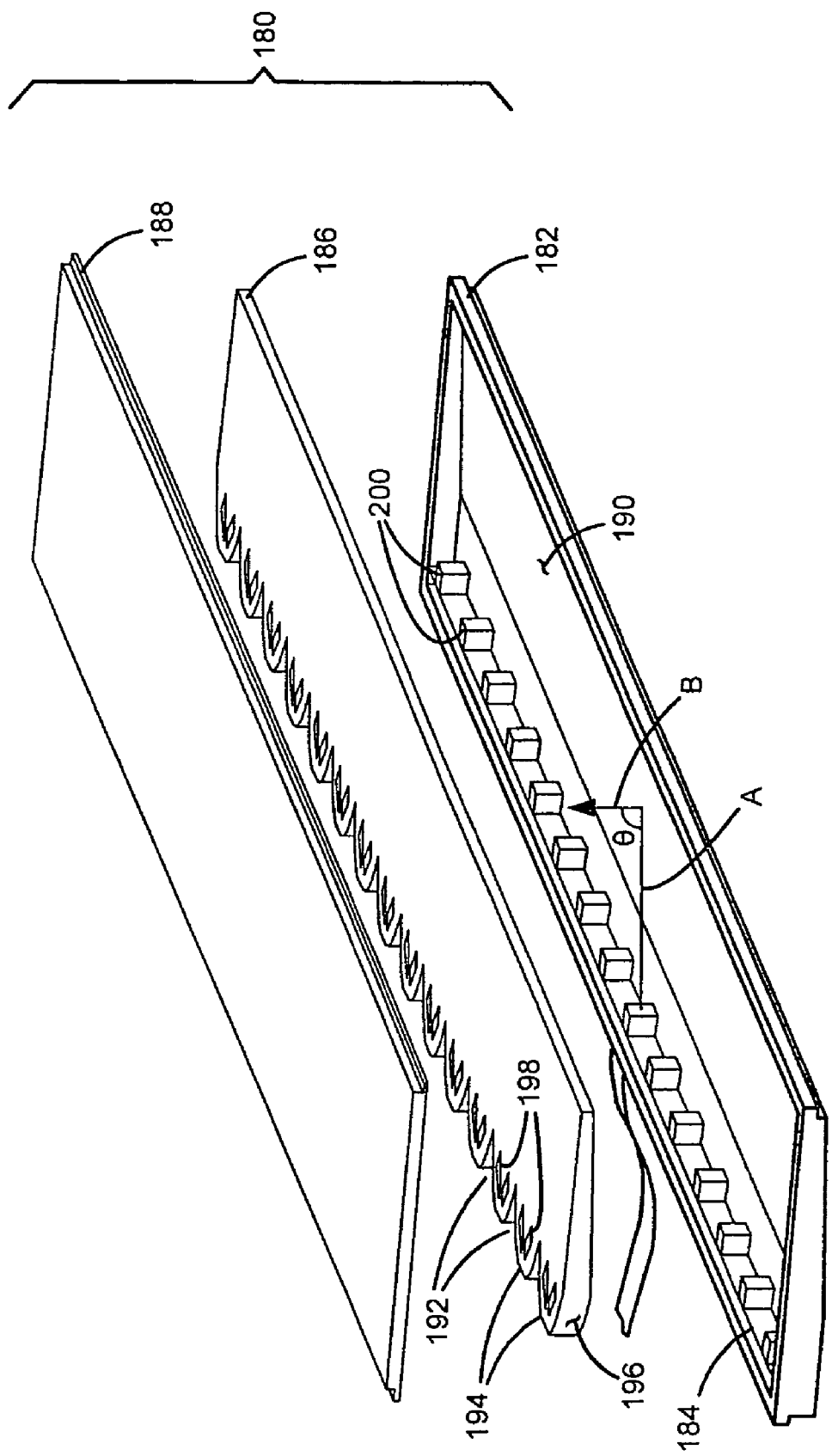
FIG. 16 is an exploded perspective view of a vehicle indicator assembly including an LED illumination circuit in accordance with the present invention.

Referring now to FIG. 16, an indicator lamp 180 is illustrated. The indicator lamp 180 is preferably provided as an ultra-thin, center mounted rear stop lamp, having a thickness of less than 7 mm, and preferably less than 6 mm. Such ultra-thin applications provide greater flexibility for installation and, particularly in the case of a rear stop lamp, enables mounting directly to a rear window.

The indicator lamp 180 includes a housing 182, an LED illumination unit 184, a light guide 186 and a cover 188. The LED illumination unit 184 is assembled to a base of the housing 182 and the light guide 186 is assembled into the housing 182 adjacent to the LED illumination unit 184. The housing 182 includes a highly reflective or mirrored sloping face 190. The light guide 186 includes a back edge having a plurality of recesses 192 formed therein to define a plurality of extensions 194 having arcuate faces 196. A plurality of sharp-angled openings 198 are defined through each extension 194. The LEDs 200 of the LED illumination unit 184 are each aligned with a recess 192 of the light guide 186. The cover 188 is preferably a clear plastic cover that encloses the LED illumination unit 184 and the light guide 186 within the housing 182.

Light emitted by the LEDs 200 is diffused and reflected in various directions within the light guide 186 by the arcuate faces 196 and the walls of the sharp-angled openings 198. The light travels through the light guide 186 along a first path A until meeting the highly reflective sloping face 190, which redirects the light along a second path B. The second path B is at an angle θ with respect to the first path A.

The present invention provides an illumination system for integrating LEDs into conventional wiring and/or flexible flat wiring to enable the placement of illumination systems in space restricted areas. By combining LEDs and technologies for routing wiring into confined spaces and guiding light to target areas, new illumination options are provided to improve both the function and aesthetics of the vehicle interior. As a result, illumination can be targeted to specific locations including, but not limited to, doorsills, reading lamps, interior courtesy lights, vanity mirrors, door handles, arm rests and interior consoles. Due to their high degree of uniform illumination, outstanding color performance, longer life-span, lower heat generation and lower power consumption, as compared with incandescent bulbs, LED integration provides strong cost-reduction, improved reliability. By embedding the LED light source within a vehicle structure, expanded implementation options are provided.

The invention claimed is:

1. An illumination system for a vehicle, comprising:
 a plurality of illumination units each having at least one light emitting diode (LED) attached thereto; and
 a plurality of electrical leads that connect the plurality of illumination units;
 wherein the plurality of illumination units and the plurality of electrical leads are interconnected to define an illumination circuit;
 wherein the illumination circuit is embedded within at least one vehicle structure;
 wherein light emitted by at least one of the illumination units is guided from within the at least one vehicle structure to illuminate a vehicle interior, and
 wherein each of said plurality of illumination units has a flexible printed circuit board mounting said at least one LED and having flat conductors printed thereon, said flat conductors and flexible printed circuit board having an extension that forms integral electrical leads.

2. The illumination system of claim 1, wherein said vehicle structure includes a gap that is defined between an exterior shell and a cover, and wherein the plurality of illumination units are disposed within the gap at a location that is remote from a light distribution surface that is exposed to the vehicle interior.

3. The illumination system of claim 1, wherein said vehicle structure includes a pillar, within which the plurality of illumination units are disposed, and wherein the pillar includes a light distribution surface that diffuses and directs light emitted from at least one of the LED's in a respective illumination unit towards a vehicle roof.

4. The illumination system of claim 1, wherein said vehicle structure includes a vehicle roof assembly having a handle attached thereto, wherein the illumination unit is disposed within a gap defined by components of the vehicle roof assembly, and wherein light emitted from the illumination unit is guided from within the gap to highlight the handle.

5. The illumination system of claim 1, wherein at least one of the plurality of illumination units further includes a housing that encloses the flexible printed circuit board and that includes an opening, through which light emitted from at least one LED of a respective illumination unit passes.

6. The illumination system of claim 1, further comprising:
 an illumination assembly including at least one of the illumination units; and
 a light guide having a light receiving face, a body and at least one light emitting face;
 wherein the light receiving face receives light emitted from the at least one LED and guides the light through a path defined by the body of the light guide from within the vehicle structure to the light emitting face, which is exposed to the vehicle interior.

7. The illumination system of claim 6, wherein the illumination assembly further includes a secondary light guide that is adjacent to the light guide and that includes a surface that reflects or absorbs a portion of the light.

8. The illumination system of claim 1, wherein at least one of said plurality of illumination units are at least partially embedded within a vehicle roof assembly.

9. The illumination system of claim 1, wherein at least one of said plurality of illumination units are at least partially embedded within a vehicle rail assembly.

10. The illumination system of claim 1, wherein at least one of said plurality of illumination units are at least partially embedded within a vehicle console.

11. The illumination system of claim 1, wherein at least one of said plurality illumination units are at least partially embedded within a vehicle seat assembly.

12. The illumination system of claim 1, wherein at least one of the plurality of illumination units includes a plurality of LEDs, and in that the plurality of LEDs include the same color LEDs.

13. The illumination system of claim 1, wherein at least one of the plurality of illumination units includes a plurality of LEDs, and in that the plurality of LEDs include different color LEDs.

14. The illumination system of claim 1, wherein the illumination system provides illumination for a doorsill.

15. The illumination system of claim 1, wherein the illumination system provides illumination for a reading lamp.

16. The illumination system of claim 1, wherein the illumination system provides illumination for an interior courtesy light.

17. The illumination system of claim 1, wherein the illumination system provides illumination for a vanity mirror.

18. The illumination system of claim 1, wherein the illumination system provides illumination for a door handle.

19. The illumination system of claim 1, wherein the illumination system provides illumination for an arm rest.

20. The illumination system of claim 1, wherein the illumination system provides illumination for an interior console.

21. The illumination system of claim 1, wherein the illumination system provides illumination for an indicator.

22. The illumination system of claim 1, wherein the illumination system provides illumination for a pillar.

23. The illumination system of claim 1, said plurality of illumination units comprising a central, high-mounted stop lamp having a thickness of less than 7 mm.

* * * * *